(12) United States Patent
Furihata et al.

(10) Patent No.: US 10,713,810 B2
(45) Date of Patent: Jul. 14, 2020

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventors: Hisayoshi Furihata, Tokyo (JP); Masahiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/623,615

(22) Filed: Jun. 15, 2017

(65) Prior Publication Data

US 2018/0005405 A1 Jan. 4, 2018

(30) Foreign Application Priority Data

Jun. 29, 2016 (JP) .................................. 2016-129134

(51) Int. Cl.
*G06K 9/00* (2006.01)
*G06T 7/70* (2017.01)
*G06T 7/521* (2017.01)
*G06K 9/20* (2006.01)
*H04N 13/239* (2018.01)
(Continued)

(52) U.S. Cl.
CPC .............. *G06T 7/70* (2017.01); *G06K 9/2036* (2013.01); *G06K 9/6201* (2013.01); *G06T 7/521* (2017.01); *H04N 5/247* (2013.01); *H04N 13/239* (2018.05); *H04N 13/254* (2018.05);
(Continued)

(58) Field of Classification Search
CPC ......... G06K 2009/6213; G06K 9/2036; G06K 9/6201; G06T 7/521; G06T 7/529; G06T 7/70; H04N 5/247

See application file for complete search history.

(56) References Cited

U.S. PATENT DOCUMENTS 8,964,189 B2 * 2/2015 Ohsawa ............. G01B 11/2536
356/601
8,970,674 B2 * 3/2015 Ota ......................... G01B 11/16
348/46

(Continued)

OTHER PUBLICATIONS

Zhang, Li, Brian Curless, and Steven M. Seitz. "Spacetime stereo: Shape recovery for dynamic scenes." Computer Vision and Pattern Recognition, 2003. Proceedings. 2003 IEEE Computer Society Conference on. vol. 2. IEEE, 2003.*

(Continued)

*Primary Examiner* — Avinash Yentrapati
(74) *Attorney, Agent, or Firm* — Rossi, Kimms & McDowell LLP

(57) ABSTRACT

An information processing apparatus, comprising: a control unit configured to control a pattern that a projection apparatus projects onto an object; an obtainment unit configured to obtain a plurality of images respectively captured at a plurality of times by a plurality of image capturing apparatuses that capture the object onto which the pattern has been projected; and a measurement unit configured to measure range information of the object by performing matching, between images respectively captured by the plurality of image capturing apparatuses, using information of temporal change of pixel values of the images.

9 Claims, 10 Drawing Sheets

(51) Int. Cl.
    *H04N 13/271*     (2018.01)
    *H04N 13/254*     (2018.01)
    *G06K 9/62*       (2006.01)
    *H04N 5/247*      (2006.01)
    *H04N 13/00*      (2018.01)

(52) U.S. Cl.
    CPC ... *H04N 13/271* (2018.05); *G06K 2009/6213* (2013.01); *H04N 2013/0081* (2013.01)

(56) References Cited

U.S. PATENT DOCUMENTS

| | | | | |
|---|---|---|---|---|
| 9,030,466 | B2* | 5/2015 | Uehira | G01B 11/2513 |
| | | | | 345/419 |
| 9,354,046 | B2* | 5/2016 | Tohara | G01B 11/25 |
| 9,621,793 | B2* | 4/2017 | Furihata | G01J 9/00 |
| 9,714,826 | B2* | 7/2017 | Higo | G06T 7/586 |
| 2007/0177160 | A1* | 8/2007 | Sasaki | G01B 11/2518 |
| | | | | 356/603 |
| 2012/0328161 | A1* | 12/2012 | Palenychka | G06K 9/00744 |
| | | | | 382/107 |
| 2013/0279762 | A1* | 10/2013 | Pau | G06T 7/344 |
| | | | | 382/107 |

OTHER PUBLICATIONS

Davis, James, Ravi Ramamoorthi, and Szymon Rusinkiewicz. "Spacetime stereo: A unifying framework for depth from triangulation." Computer Vision and Pattern Recognition, 2003. Proceedings. 2003 IEEE Computer Society Conference on. vol. 2. IEEE, 2003.*

Newcombe, Richard A., et al. "KinectFusion: Real-time dense surface mapping and tracking." 2011 10th IEEE International Symposium on Mixed and Augmented Reality. IEEE, 2011. (Year: 2011).*

Hashimoto et al. "3-D Object Recognition Based on Integration of Range Image and Gray-scale Image.", British Machine Vision Conference (BMVC). 2001:253-262. Cited in Specification.

Tsai. "A Versatile Camera Calibration Technique for High-Accuracy 3D Machine Vision Metrology Using Off-the-Shelf TV Cameras and Lenses." IEEE Journal of Robotics and Automation. Aug. 1987:323-344. vol. RA-3, No. 4. Cited in Specification.

Newcombe et al. "KinectFusion: Real-Time Dense Surface Mapping and Tracking." ISMAR. 2011. Cited in Specification.

Bleyer et al. "PatchMatch Stereo—Stereo Matching with Slanted Support Windows." Proc. BMVC. 2011. Cited in Specification.

* cited by examiner

FIG. 13
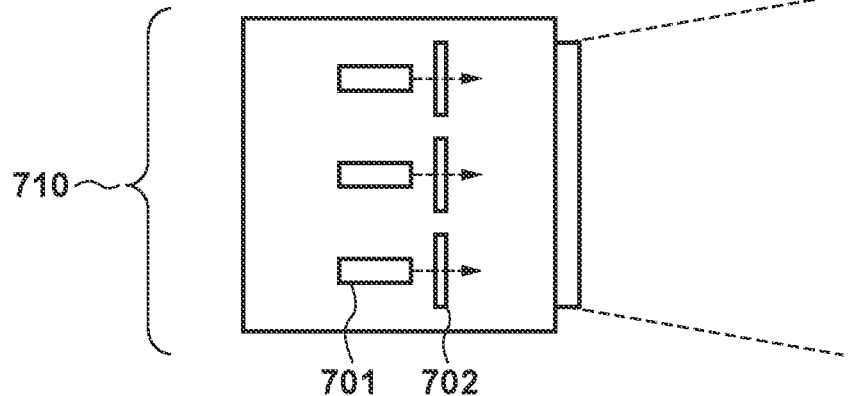
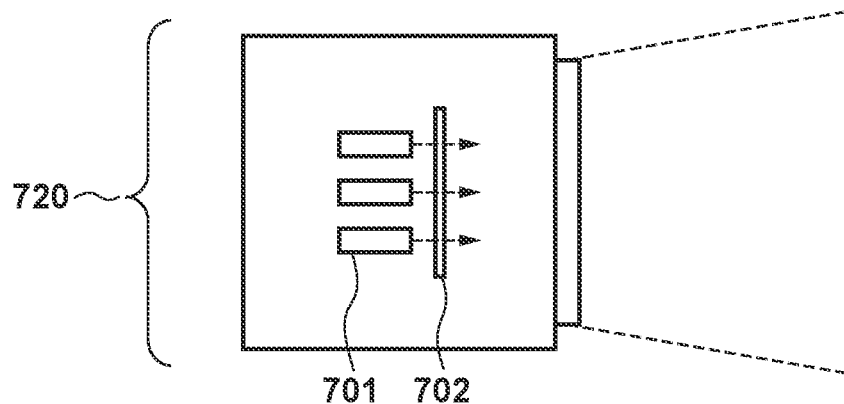
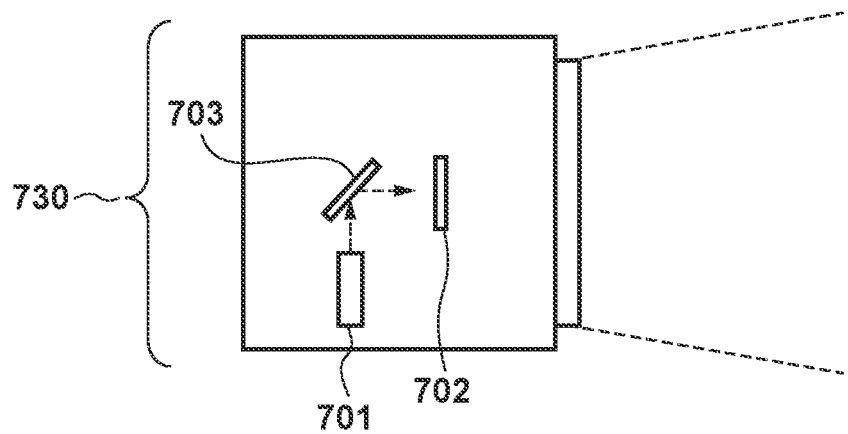

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to an information processing apparatus, a method of controlling an information processing apparatus, and a storage medium.

Description of the Related Art

There is a known technique for calculating, by a method such as block matching, a correspondence between regions on two images captured by a stereo camera, and using an obtained correspondence relationship to measure a distance to an object surface based on the principle of triangulation. In block matching, matching is typically performed after approximating image sites with flat blocks. However, in a distance measuring method that uses a stereo camera, if an object that has few features such as white paper for example is set as a target, precision of the block matching may decrease.

With respect to this, Manabu Hashimoto and Kazuhiko Sumi, "3-D Object Recognition Based on Integration of Range Image and Gray-scale Image", British Machine Vision Conference (BMVC), 2001 discloses a technique of projecting a texture pattern onto a surface of an object to add two-dimensional features to the surface, and by block matching that using images capturing the object by a stereo camera, measuring a distance to the surface of the object.

However, in the technique recited in Manabu Hashimoto and Kazuhiko Sumi, "3-D Object Recognition Based on Integration of Range Image and Gray-scale Image", British Machine Vision Conference (BMVC), 2001, there is the problem that, in the case of a shape having severe unevenness such as a thin shape or a small shape, it is difficult to approximate with a flat block, and precision of a distance measurement can decrease.

The present invention was made in view of the aforementioned problem, and provides a technique for performing a distance measurement at high precision that does not depend on the shape of an object.

SUMMARY OF THE INVENTION

According to one aspect of the present invention, there is provided an information processing apparatus, comprising: a control unit configured to control a pattern that a projection apparatus projects onto an object; an obtainment unit configured to obtain a plurality of images respectively captured at a plurality of times by a plurality of image capturing apparatuses that capture the object onto which the pattern has been projected; and a measurement unit configured to measure range information of the object by performing matching, between images respectively captured by the plurality of image capturing apparatuses, using information of temporal change of pixel values of the images.

Further features of the present invention will become apparent from the following description of exemplary embodiments with reference to the attached drawings.

BRIEF DESCRIPTION OF THE DRAWINGS

FIG. 13 is a view illustrating a configuration of a projection apparatus according to a first variation.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In the present embodiment, a texture pattern for which a texture is caused to change in accordance with the passage of time is projected onto an object by a projector, and the object is captured by a stereo camera. Explanation is given of an example of, for the captured images, using information of a temporal change of pixel values of the images to perform matching and thereby measure a distance to the object. An example of change of a texture pattern is illustrated by texture patterns 110, 120, and 130 of FIG. 1. The texture patterns 110, 120, and 130 are patterns in which the positions of dots are changed over time.

<Typical Block Matching>

Firstly, explanation is given regarding typical block matching. In typical block matching, matching is performed based on information of a two-dimensional luminance distribution on an image. For example, matching is performed after approximating each site of an object in the image with a flat block. Note that, to accurately perform matching, luminance distribution information that is greater than or equal to a certain amount is necessary, and as a consequence it is necessary to set the size of a block to be greater than or equal to a certain size. However, in a case of setting, as a measurement target, an object having a shape with severe unevenness, which is hard to approximate with a flat block, there is a possibility of measurement precision of a distance decreasing.

Figure 2:
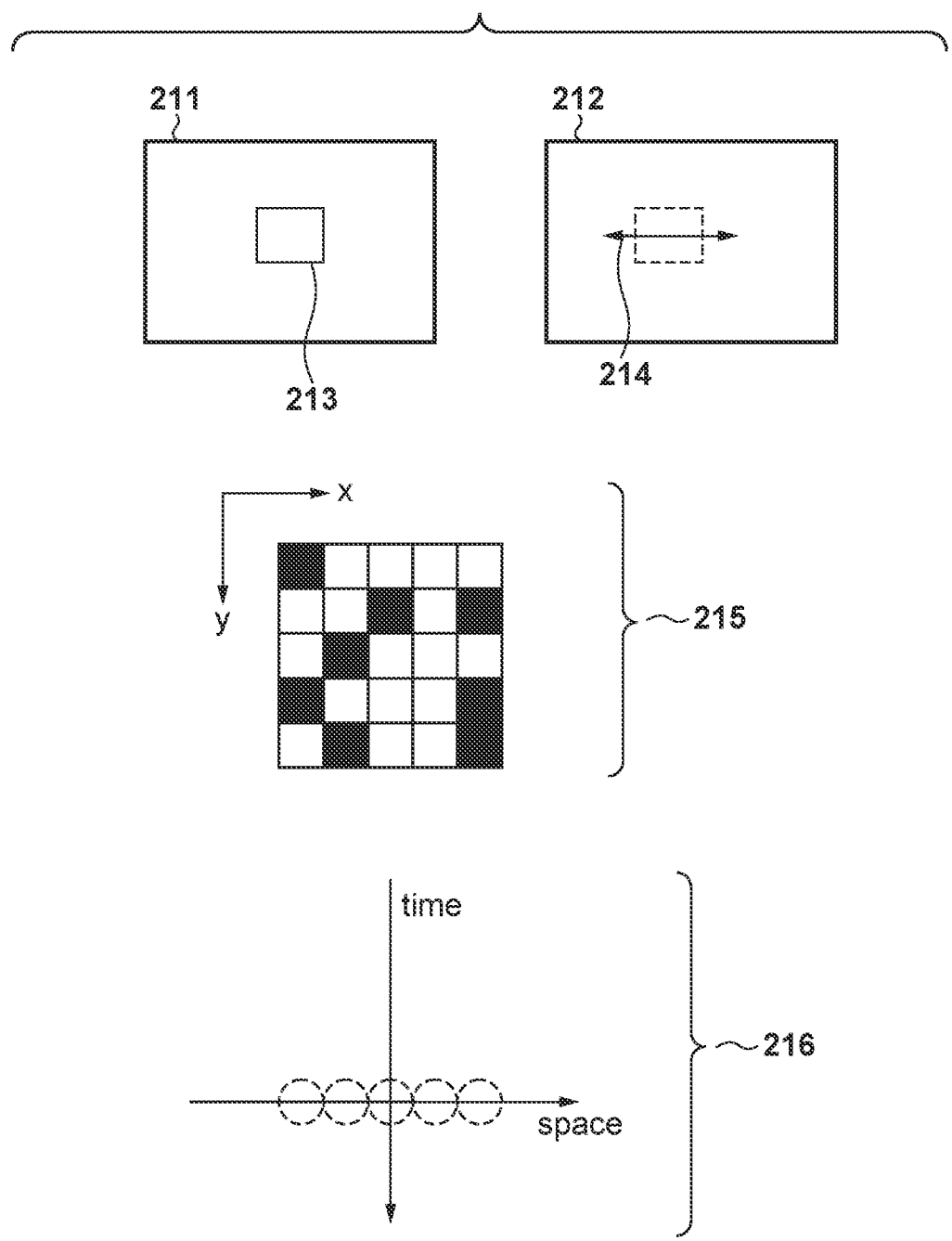
FIG. 2 is a view for explaining a typical block matching method.

FIG. 2 is a view for explaining a method of measuring distance based on a typical block matching method. Reference numerals 211 and 212 of FIG. 2 indicate images captured by a stereo camera. Reference numeral 213 indicates a block used in measurement of a distance. Reference numeral 214 indicates a range in which to perform block matching. Reference numeral 215 indicates pixels in the block 213 that is used in matching. The colors of the plurality of rectangles of 215 indicate the luminance values of the respective pixels. As indicated by reference numeral 215, in typical block matching, matching is performed by using pixels (spatial information) included at two-dimensional coordinates within a block of an image as clues. Here "spatial" information represents information that is distributed in coordinate axis (x axis and y axis) directions of the image. Reference numeral 216 is a graph that represents coordinates of pixels in the block 213, which is used in matching, on a time axis and a space axis. The space axis of reference numeral 216 is an axis that summarizes two-dimensional spatial x and y axes in one axis for simplification. As indicated by reference numerals 215 and 216, in typical block matching, matching is performed by using only spatial information of a specific time.

Block Matching According to Embodiments

In contrast to this, in the present embodiment, matching is performed by also using information of a temporal luminance change (change of the pixel value) of the image pixel, due to change of the texture pattern. Here, it is possible to set the spatial size of a block to be smaller in proportion to the addition of temporal luminance change information for pixels. In the case of a block having a small spatial size, flat surface approximation is possible even with respect to a shape having severe unevenness, and thus it is possible to measure a distance without lowering the precision.

Figure 3:
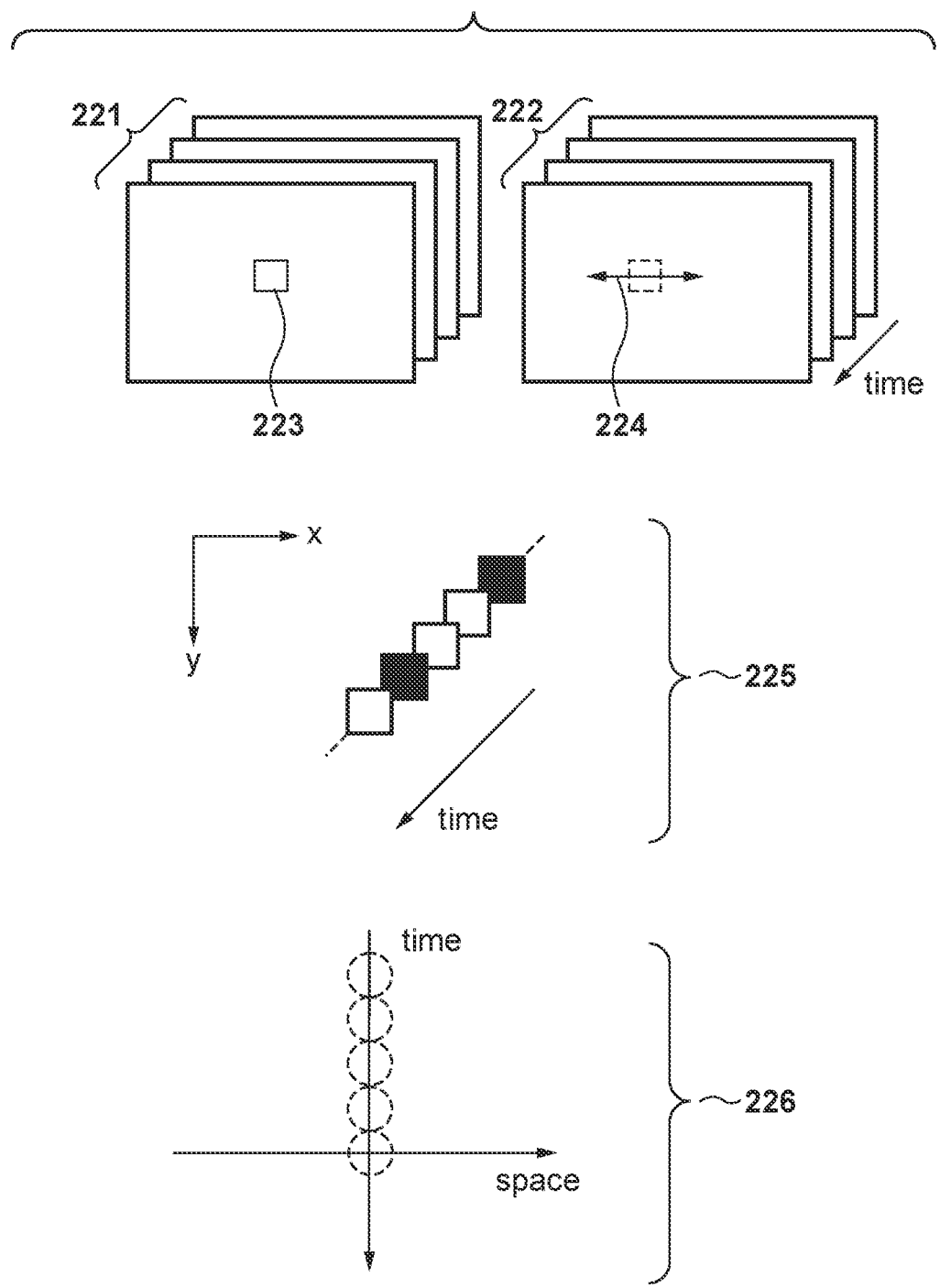
FIG. 3 is a view for explaining a block matching method according to a first embodiment.

FIG. 3 is a view for explaining a block matching method according to the present embodiment. Reference numerals 221 and 222 of FIG. 3 indicate image groups captured by a stereo camera. Reference numerals 221 and 222 indicate a state in which images captured at different times are ordered. Reference numeral 223 indicates a block used in matching. For a block in the present embodiment, in order to set the spatial size in the image to be small, information of pixels of images at different times is used. In the present embodiment, the spatial size of a block is set to one pixel. Reference numeral 224 indicates a range in which to perform matching of a block. Reference numeral 225 indicates each pixel in the block that is used in matching. Reference numeral 226 is a graph that represents coordinates of the pixels in the block 223, which is used in matching, in a time axis and a space axis. As illustrated by 225 and 226, in the present embodiment, matching is performed by using temporal luminance change of image pixels.

In the present embodiment, it is possible to set the spatial size of a block to be small by performing matching that applies information of temporal luminance change of image pixels. In the case of a block having a small spatial size, flat surface approximation is possible even with respect to a shape having severe unevenness, and thus it is possible to measure a distance at high precision.

<Configuration of Information Processing System>

Figure 4:
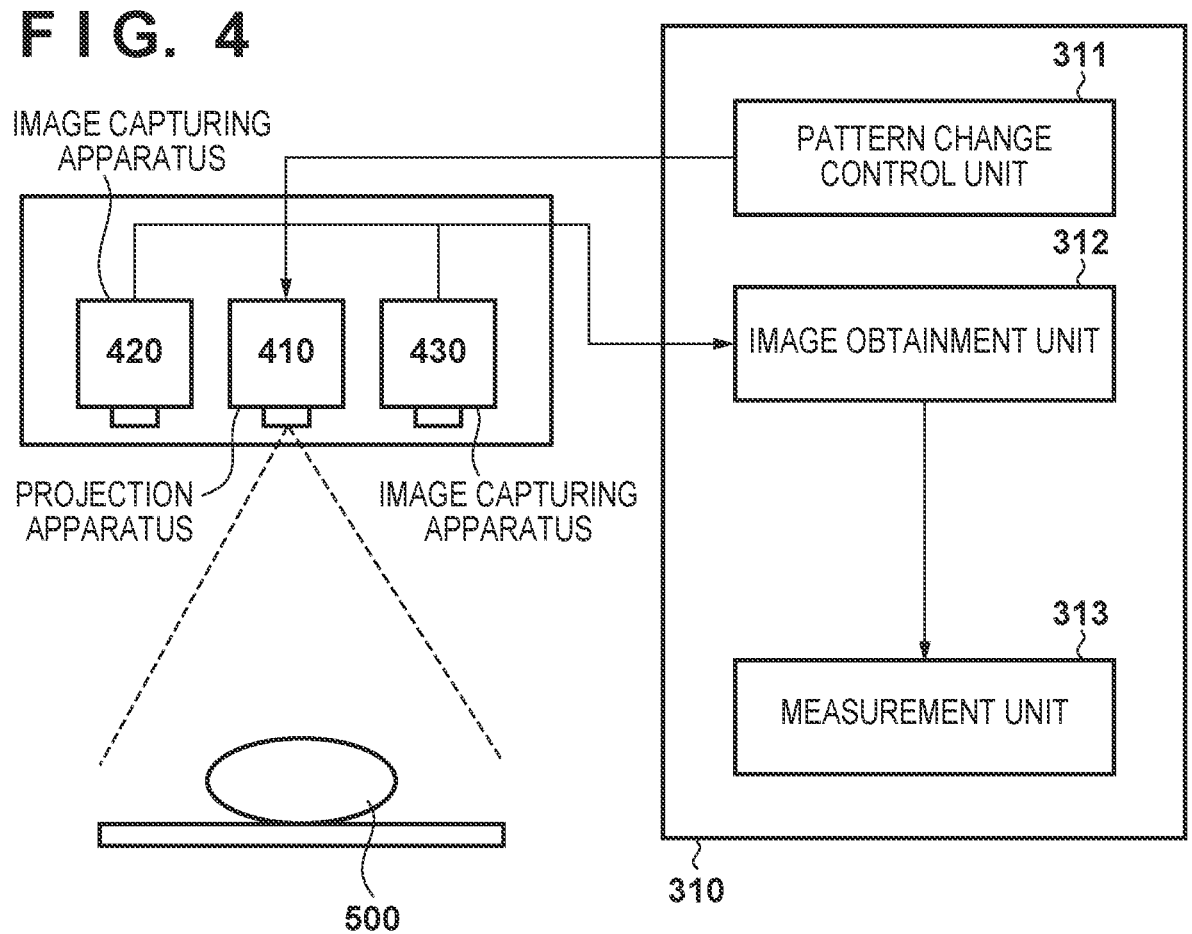
FIG. 4 is a view illustrating a configuration of an information processing apparatus according to a first embodiment.

Next, explanation is given regarding an example of a configuration of an information processing system according to the present embodiment. As illustrated by FIG. 4, the information processing system is provided with an information processing apparatus 310, a projection apparatus 410, and image capturing apparatuses 420 and 430. The reference numeral 500 is an object that is a measurement target. The information processing apparatus 310 is provided with a pattern change control unit 311, an image obtainment unit 312, and a measurement unit 313. The projection apparatus 410 is a projector that, in accordance with image input, projects a texture pattern toward the object 500. The image capturing apparatuses 420 and 430 are two cameras that capture grayscale images for example. In the present embodiment, it is assumed that the projection apparatus 410 and the image capturing apparatuses 420 and 430 have a positional relationship that is fixed relative to each other.

In addition, intrinsic parameters such as a lens distortion parameter, position of principal points, and focal lengths of the image capturing apparatuses 420 and 430, and extrinsic parameters that indicate relative positions and orientations of the image capturing apparatus 420 and the image capturing apparatus 430 are calibrated in advance. A calibration method may be a publicly known method, and calibration may be performed by the method indicated in R. Y. Tsai, "A versatile camera calibration technique for high-accuracy 3D machine vision metrology using off-the-shelf TV cameras and lenses" IEEE Journal of Robotics and Automation, vol. RA-3, no. 4, 1987. Note that the image capturing apparatus 420 and the image capturing apparatus 430 are arranged in a state in which they are lined up horizontally. In addition, the image capturing apparatus 420 may be expressed below as an apparatus for a left eye I1, and the image capturing apparatus 430 may be expressed as an apparatus for a right eye I2.

Next, detailed explanation is given regarding the configuration of the information processing apparatus 310. The pattern change control unit 311 controls the projection apparatus 410 which projects a texture pattern with respect to the object 500, and the texture pattern is caused to change with respect to the passage of time.

The image obtainment unit 312 obtains images captured by the image capturing apparatuses 420 and 430 at a plurality of times t. The images obtained here are used to measure distance in accordance with matching. t represents times (t=t0, t1, t2, . . . ) at which images are captured. At each time t, an image captured by the left eye I1 apparatus is represented by I1($t$), and the image captured by the right eye I2 apparatus is represented as I2($t$). Image pixel values are represented by I1($t, u, v$) and I2($t, u, v$). u and v represent coordinates for the x axis and the y axis on an image. The origin point of the coordinates is the top-left of an image, letting a rightward orientation of the image be the x axis and a downward orientation of the image be the y axis.

The measurement unit 313 measures a distance map D(tn) with respect to an image captured by the apparatus for the left eye I1, based on an image group obtained by the image obtainment unit 312. Here, tn represents times at which to calculate distance. In addition, the distance at each of coordinates (u, v) for the distance map D(tn) is represented as D(tn, u, v). The distance D(tn, u, v) is a one-dimensional numerical value that represents a length for the orientation of the optical axis of the apparatus for the left eye I1 (a z axis direction). In the measurement unit 313, after first measuring a parallax map d(tn) of images captured by the stereo camera (the image capturing apparatuses 420 and 430), the parallax map is then converted to a distance map. The parallax of each of coordinates (u, v) of the parallax map d(tn) is represented as d(tn, u, v). The parallax d(tn, u, v) is a one-dimensional numerical value that represents a difference between the coordinates (u, v) on the image captured by the apparatus for the left eye I1 and the corresponding coordinates on the image captured by the apparatus for the right eye I2.

<Processing>

Figure 5:
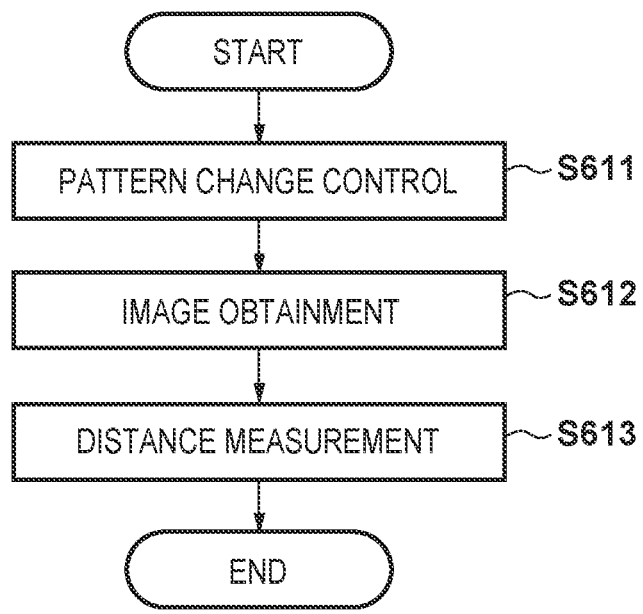
FIG. 5 is a flowchart illustrating a processing procedure of an information processing apparatus according to the first embodiment.

Next, explanation is given regarding an example of processing performed by an information processing apparatus according to the present embodiment. FIG. 5 is a flowchart that illustrates a procedure for processing that the information processing apparatus 310 according to the present embodiment performs.

(Step S611)

The pattern change control unit 311 controls a texture pattern that the projection apparatus 410 projects with respect to the object 500. At this point, it causes the texture pattern to change in accordance with the passage of time. In the present embodiment, N different random patterns are prepared as the texture pattern, and control to switch the random patterns is performed in alignment with image capturing timings of the image capturing apparatus 420 and the image capturing apparatus 430.

The random patterns are, for example, generated by causing the luminance values (the pixel values) of a pattern to change randomly. The different random patterns are generated by changing a random seed. Examples of different random patterns are indicated by reference numerals 110, 120, and 130 illustrated in FIG. 1. Reference numerals 110, 120, and 130 of FIG. 1 have respectively different positions of dots that are randomly arranged in a pattern. Note that, in the present embodiment, a random pattern is generated by setting white dots to a high luminance and a background to low luminance.

(Step S612)

The image obtainment unit 312 obtains images captured by the image capturing apparatuses 420 and 430 at a plurality of times t. In the present embodiment, a time at which to calculate distance is tn, and M images of the past, including the time tn, are obtained.

(Step S613)

The measurement unit 313 measures a distance map D(tn) with respect to images of the left eye I1 by searching for correspondences between images based on temporal change of pixel values of images, in relation to an image group respectively captured by the plurality of image capturing apparatuses 420 and 430 and obtained by the image obtainment unit 312. By measurement of the distance map D(tn), a distance to the object 500 is measured.

Firstly, each pixel in an image of the left eye I1 is selected in order. In the present embodiment, pixels are selected in order from the top-left of the image to the bottom-right, as in a raster scan. The coordinates of a selected pixel are represented as (u, v) below.

Next, regarding the coordinates (u, v) on an image of the left eye I1, measurement of coordinates is performed for a corresponding image of the right eye I2. In other words the parallax d(tn, u, v) is measured. Here, based on a degree of alignment E of matching that takes a value of the parallax as a variable, a value d of the parallax for which the degree of alignment E is highest is searched for. The degree of alignment E is calculated based on a SAD (Sum of Absolute Difference) indicated in Equation (1).

[EQUATION 1]

$$E(tn, u, v, d) = -SAD(tn, u, v, d) = -\sum_{t=tn-(M-1)}^{tn} \sum_{a=-w}^{w} \sum_{b=-w}^{w} F(t, u+a, v+b, d) \quad (1)$$

[EQUATION 2]

$$F(t, x, y, d) = |I1(t, x, y) - I2(t, x-d, y)| \quad (2)$$

The degree of alignment E, which is an evaluation value of Equation (1), is a value that gets higher the more that pixel values compared between the left eye I1 and the right eye I2 are aligned. Here, a sum total of degrees of alignment of pixel values is calculated for a time t and coordinates (a, b) centered on the coordinates (u, v). W represents a spatial size of a block used in matching. M represents a temporal size of a block used in matching. A function F is a function for measuring a difference between pixel values of two pixels that indicates a parallax d, for the time t and the coordinates (x, y) of interest. Details of F are indicated in Equation (2). In the function F, an absolute value of the difference between pixel values of coordinates (x, y) and coordinates (x-d, y) is measured for an image I1(t) and an image I2(t) at the time t.

In the present embodiment, calculation is made by setting W=0 and setting the spatial size of a block to be one pixel. Therefore, the values of a and b are always 0, and pixels surrounding the coordinates (u, v) of interest are not used. Meanwhile, as the first (leftmost) sum (Σ) of Equation (1) indicates, the pixel values at the coordinates (u, v) of interest in a range of M images from a time t−(M−1) to the time t are used. By this, the value of the degree of alignment E increases when a parallax d for which temporal luminance change of pixel values aligns is provided.

Based on the calculation equation Equation (1) for the degree of alignment E explained above, the parallax d is caused to change in a predetermined range (dmin to dmax), and a parallax d for which the degree of alignment E is highest is selected. The d selected here is denoted below as d(tn, u, v). Note that dmin and dmax represent a lower limit and an upper limit of parallax of a stereoscopic image. The values of dmin and dmax are assumed to be fixed values that are set in advance.

Next, the parallax d(tn, u, v) is converted to the distance D(tn, u, v). In the case where the relative positions and orientations of the image capturing apparatuses 420 and 430 are known, it is possible to convert between parallax and distance. An example of a conversion formula is indicated by Equation (3).

[EQUATION 3]

$$D = A(d) = \frac{f \cdot L}{d}, d = B(D) = \frac{f \cdot L}{D} \quad (3)$$

Here, a function A represents a function for converting parallax to distance, and B represents a function for converted distance to parallax. f represents a focal length of a camera, L represents a baseline (stereo camera spacing) of a stereo camera (the image capturing apparatuses 420 and 430), D represents distance, and d represents parallax. Out of these, the function A is used to convert the parallax d(tn, u, v) to the distance D(tn, u, v). By performing the above operation while changing the coordinates (u, v) of a selected pixel, the distance map D(tn) with respect to an image of the left eye I1 is measured.

As described above, in the present embodiment, it is possible to set the spatial size of a block to be small by performing matching that applies information of temporal luminance change (pixel value change) of image pixels. In the case of a block having a small spatial size, flat surface approximation is possible even with respect to a shape having severe unevenness, and thus it is possible to measure a distance at high precision. Accordingly, it is possible to perform a distance measurement with high precision and without depending on the shape of the object.

Second Embodiment

In the present embodiment, explanation is given of a method of distance measurement under dynamic conditions. Here, dynamic conditions means a case in which relative positions and orientations between an image capturing apparatus and an object change. Specifically, in the present embodiment consideration is given for a case in which the image capturing apparatus is moved.

Under the dynamic conditions, pixels of an object at different positions are measured each time image capturing is performed. In the present embodiment explanation is given of an example in which, to solve this problem, the position and orientation of the image capturing apparatus are measured and coordinates to use in matching are selected so as to cancel the change of object position measured in the images.

Figure 6:
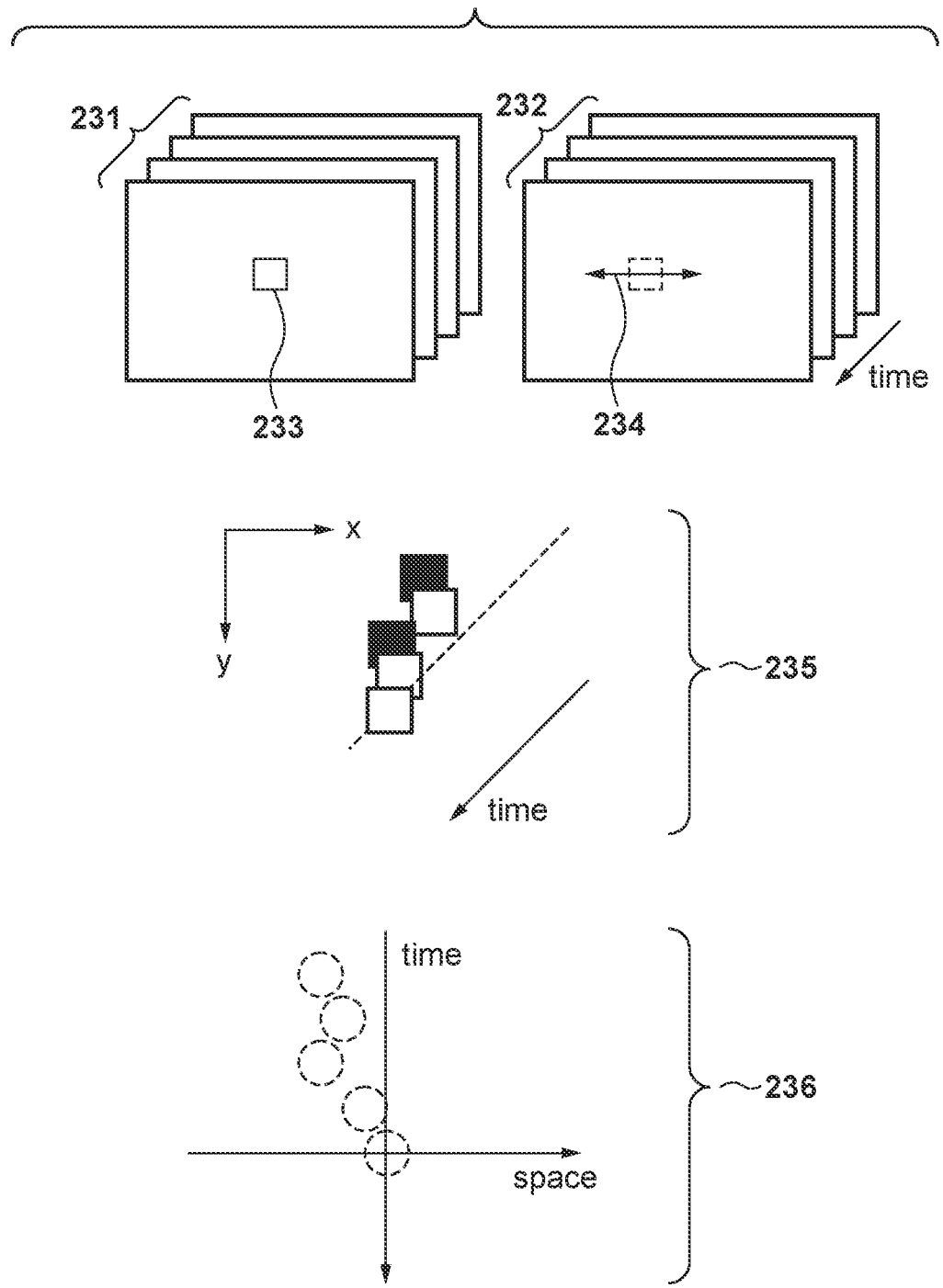
FIG. 6 is a view for explaining a block matching method according to a second embodiment.

FIG. 6 is a view for explaining a matching method of the present embodiment. Reference numerals 231 and 232 of FIG. 6 indicate images captured by a stereo camera. Reference numerals 231 and 232 illustrate a state in which images captured at different times are ordered. Reference numeral 233 indicates a block used in matching. In the present embodiment, the spatial size of a block is set as one pixel. Reference numeral 234 indicates a range in which to perform matching of a block. Reference numeral 235 indicates each pixel in the block that is used in matching. The color of the plurality of rectangles of 235 indicates the luminance value of respective pixels. Reference numeral 236 is a graph that represents pixel coordinates in the block 233, which is used in matching, on a time axis and a space axis. As illustrated by reference numerals 235 and 236, in the matching of the present embodiment, instead of simply selecting pixels at the same coordinates, based on positions and orientations at each time, coordinates to use on an image are selected so as to cancel object position change measured in the image.

Figure 7:
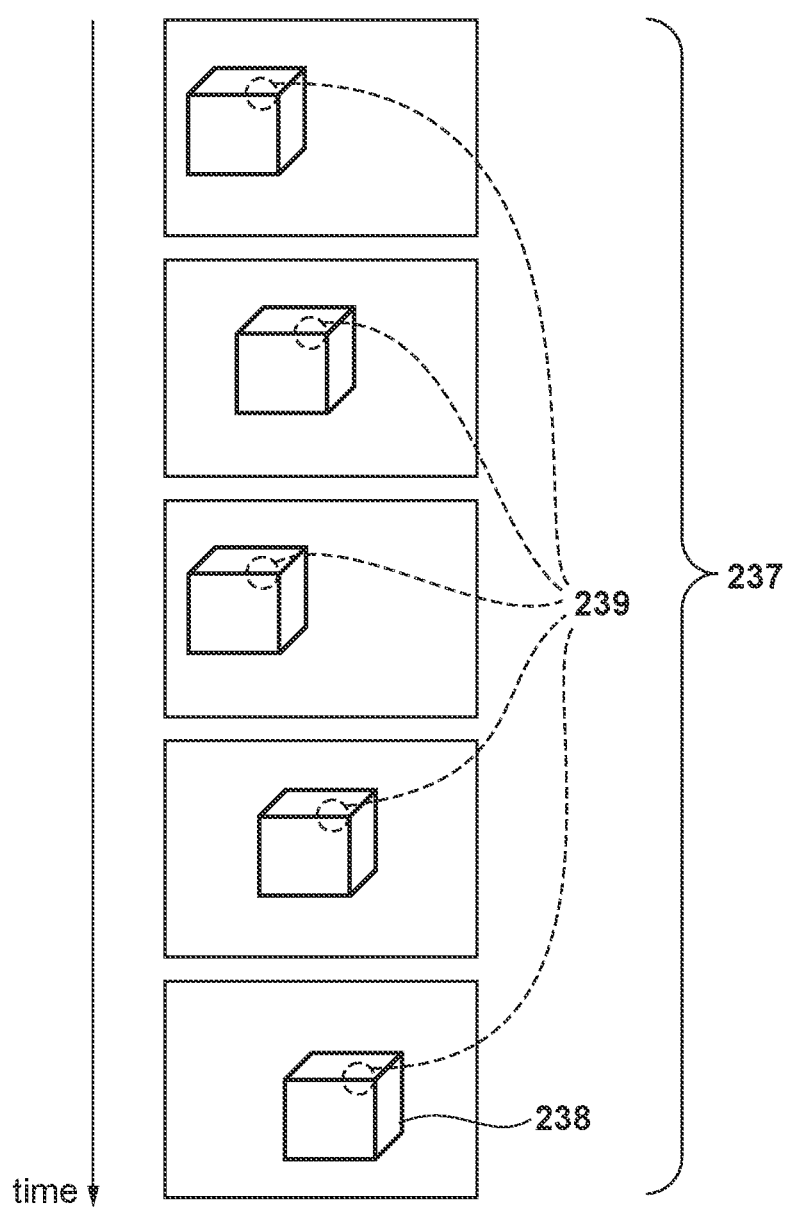
FIG. 7 is another view for explaining the block matching method according to the second embodiment.
Figure 8:
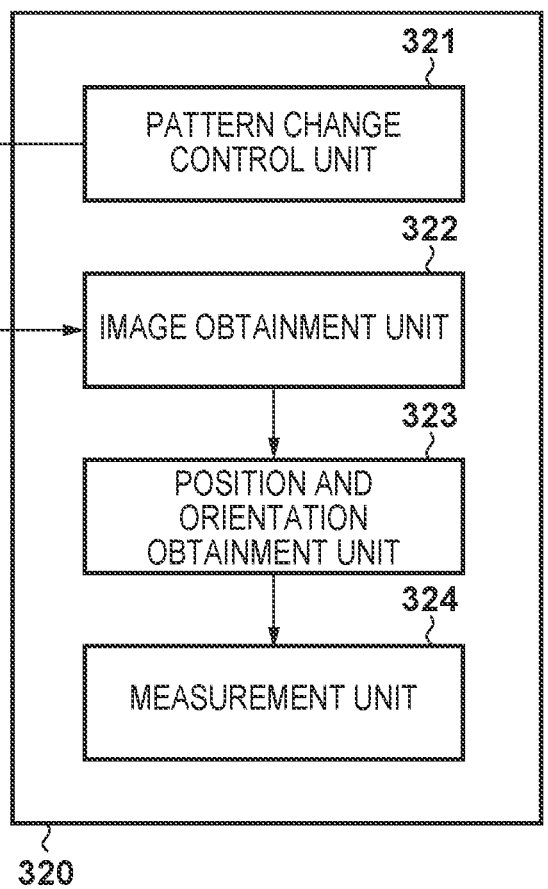
FIG. 8 is a view illustrating a configuration of an information processing apparatus according to the second embodiment.

FIG. 7 represents in detail an example of selecting coordinates of a pixel to use in matching from an image group. Reference numeral 237 represents an image group that is captured. Reference numeral 238 is an object that is measured in the images. Reference numeral 239 represents a result of selecting coordinates of a pixel to use in matching so as to cancel the change of the position of the object. Here, because a texture pattern is projected onto the object, for pixels selected here, there is change in a luminance value thereof as illustrated by reference numeral 235 of FIG. 6, and matching is performed by using this change as a feature.

<Configuration of Information Processing System>

Next, explanation is given regarding an example of a configuration of an information processing system according to the present embodiment. In the present embodiment, a configuration of an information processing apparatus differs from that in the first embodiment. In the figure, reference numeral 320 indicates an information processing apparatus in the present embodiment. In the present embodiment, it is assumed that the projection apparatus 410 and the image capturing apparatuses 420 and 430 have a positional relationship that is fixed relative to each other. An information processing apparatus 320 is provided with a pattern change control unit 321, an image obtainment unit 322, a position and orientation obtainment unit 323, and a measurement unit 324.

In the present embodiment, the object 500 is measured while moving the projection apparatus 410 and the image capturing apparatuses 420 and 430, which are fixed relative to one another, as a set.

The pattern change control unit 321 and the image obtainment unit 322 have similar functions to the pattern change control unit 311 and the image obtainment unit 312 according to the first embodiment. The position and orientation obtainment unit 323 obtains positions and orientations of the image capturing apparatus 420 at a plurality of times t. Here for a position and orientation, the disposition of the image capturing apparatus 420 at a time to is taken as a reference coordinate system, and the position and orientation of the image capturing apparatus 420 at each time t are obtained. Note that a position and orientation are configured in detail by a rotation matrix R having 3 rows and 3 columns, and a translation vector T having 3 rows and 1 column.

The measurement unit 324 measures a distance map D(tn) with respect to an image for the left eye I1, based on an image group obtained by the image obtainment unit 322. Differing from the first embodiment, when performing matching to measure parallax, the measurement unit 324 selects coordinates on an image that are to be used for matching based on the position and orientation of the image capturing apparatus 420 at each time.

<Processing>

Figure 9:
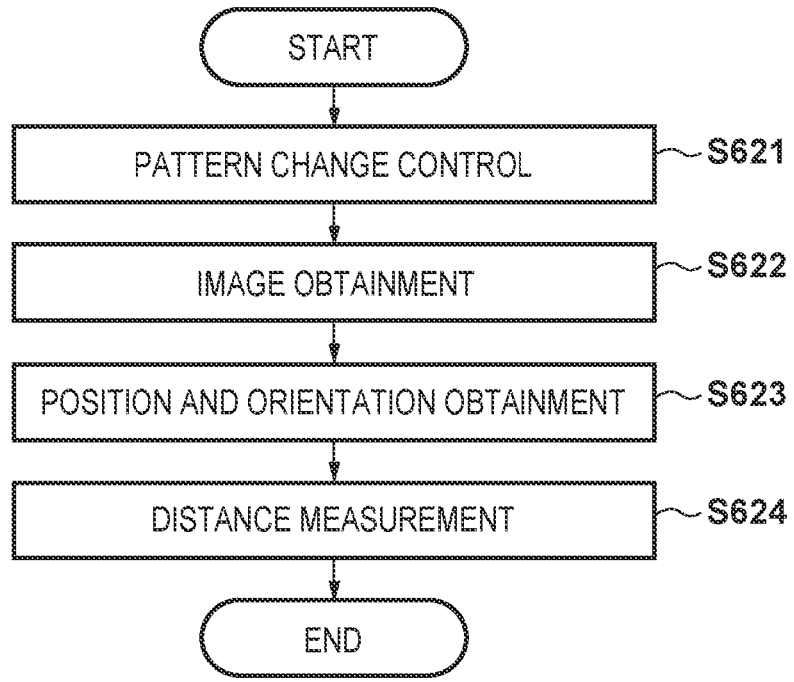
FIG. 9 is a flowchart illustrating a processing procedure of an information processing apparatus according to the second embodiment.

Next, explanation is given regarding processing performed by an information processing apparatus according to the present embodiment. FIG. 9 is a flowchart that illustrates a procedure for processing that the information processing apparatus 320 according to the present embodiment performs.

Because processing in the present embodiment for pattern change control (step S621) and image obtainment (step S622) are the same as the processing in the first embodiment, explanation thereof is omitted. Explanation is given below regarding processing for position and orientation obtainment (step S623) and measurement (step S624).

(Step S623)

The position and orientation obtainment unit 323 obtains positions and orientations of the image capturing apparatus 420 at each time t. In the present embodiment, explanation is given for a method of measuring position and orientation based on ICP (iterative closest point).

Firstly, a distance map at each time t is measured by using images for one time. Here, the distance map to measure is represented as D'(t). The distance map D'(t) can be calculated based on typical block matching that is based on spatial information of an image, for example. For example, the method recited in Manabu Hashimoto and Kazuhiko Sumi, "3-D Object Recognition Based on Integration of Range Image and Gray-scale Image", British Machine Vision Conference (BMVC), 2001 can be used.

Next, a relative position and orientation with respect to the reference coordinate system at the time tn is measured by using ICP (iterative closest point) to align the distance map D'(t) for each time t with respect to the distance map D'(tn)

at the time tn which is a reference. For a method of measuring position and orientation based on ICP (iterative closest point), it is possible to use a method based on R. A. Newcombe, S. Izadi, O. Hilliges, D. Molyneaux, D. Kim, A. J. Davison, P. Kohli, J. Shotton, S. Hodges, and A. Fitzgibbon. KinectFusion: Real-Time Dense Surface Mapping and Tracking, ISMAR 2011 or the like. Here, a rotation matrix and translation vector obtained at each time t are respectively represented by R(t) and T(t).

(Step S624)

The measurement unit 324 measures a distance map D(tn) with respect to an image for the left eye I1, based on an image group obtained by the image obtainment unit 322. Firstly, each pixel of the left eye I1 is selected in order. In the present embodiment, pixels are selected in order from the top-left of the image to the bottom-right, in accordance with the gist of a raster scan. The coordinates of a selected pixel are represented as (u, v) below.

Next, regarding the coordinates (u, v) on an image of the left eye I1, measurement is performed for corresponding coordinates in an image of the right eye I2. In other words the parallax d(tn, u, v) is measured. Here, based on a degree of alignment E of matching for a time when the value of the parallax changed, a value d of the parallax for which the degree of alignment E is highest is searched for. The degree of alignment E is calculated based on a SAD (Sum of Absolute Difference) indicated in Equation (4).

[EQUATION 4]

$$E(tn, u, v, d) = \qquad\qquad\qquad\qquad\qquad\qquad (4)$$
$$-SAD(tn, u, v, d) = -\sum_{t=tn-(M-1)}^{tn}\sum_{a=-w}^{w}\sum_{b=-w}^{w} G(t, u+a, v+b, d)$$

[EQUATION 5]

$$G(t, x, y, d) = |I1(t, Sx, Sy) - I2(t, Sx - Sd, Sy)| \qquad (5)$$

[EQUATION 6]

$$\begin{pmatrix} Sx \\ Sy \end{pmatrix} = Q(P(t, O(x, y, d))), Sd = B(Pz(t, O(x, y, d))) \qquad (6)$$

[EQUATION 7]

$$O(x, y, d) = A(d) \cdot \begin{pmatrix} (x - Cx)/f \\ (y - Cy)/f \\ 1 \end{pmatrix} \qquad (7)$$

[EQUATION 8]

$$P(t, K) = R(t) \cdot K + T(t) \qquad (8)$$

[EQUATION 9]

$$Q(K) = \begin{pmatrix} f \cdot (Kx/Kz) + Cx \\ f \cdot (Ky/Kz) + Cy \end{pmatrix} \qquad (9)$$

The degree of alignment E, which is an evaluation value of Equation (4), is a value that gets higher the more that pixel values compared between the left eye I1 and the right eye I2 are aligned. Here, a sum total of degrees of alignment of pixels is calculated for a time t and spatial coordinates of a position (a, b) centered on the coordinates (u, v). W represents a spatial size of a block used in matching. M represents a temporal size of a block used in matching. A function G is a function for measuring a difference between pixel values of two pixels that indicates a parallax d, for the time t and the coordinates (x, y) of interest. Details of the function G are indicated in Equation (5). In the function G, pixel values are referred to after calculating a parallax Sd and coordinates (Sx, Sy) to select in the position and orientation at a time t, based on the values of the parallax d and the coordinates (x, y) at the time to which is a reference.

A detailed calculation is illustrated in Equation (6), Equation (7), Equation (8), and Equation (9). Here, a function O of Equation (7) represents a function for converting values of the parallax d and the coordinates (x, y) to three-dimensional coordinates. Cx and Cy of the function O are parameters that represent an image center for the image capturing apparatus 420, and f represents a focal length of the image capturing apparatus 420. A is a function for converting the parallax to distance, and details thereof are as indicated in Equation (3). A function P of Equation (8) represents a function for converting three-dimensional coordinates K to the position and orientation of the image capturing apparatus 420 at the time t. A function Q of Equation (9) represents a function for converting the three-dimensional coordinates K into two-dimensional coordinates on an image. Kx, Ky, and Kz of the function Q represent components of respective axes of the three-dimensional coordinates K.

In Equation (6), the coordinates (Sx, Sy) on an image at time t are calculated based on the function Q after the three-dimensional coordinates at the time t are calculated from the values of the parallax and the coordinates (x, y) of interest, based on the function O and the function P. In addition, the parallax Sd at time t is calculated based on the function B. The function B is a function for converting the parallax to distance, and details thereof are as indicated in Equation (3). Pz(t, O(x, y, d)) of Equation (6) represents a z-axis component of the three-dimensional coordinates indicated by the function P.

In the present embodiment, calculation is made by letting W=0 and setting the spatial size of a block to be one pixel. Meanwhile, as illustrated by the first sum (Σ) of Equation (4), the difference of pixel values is calculated in a range of M images from a time tn−(M−1) until the time tn. At this point, the coordinates for the two pixels for which the difference between pixel values is measured are selected in accordance with the position and orientation of the image capturing apparatus 420 at each time t. Based on the calculation equation Equation (4) for the degree of alignment E explained above, the parallax d is caused to change in a predetermined range (dmin to dmax), and a parallax d for which the degree of alignment E is highest is selected. The selected parallax d is denoted as d(t, u, v).

Next, the parallax d(t, u, v) is converted to the distance D(t, u, v). The conversion formula is as indicated by Equation (3). By performing the above operation while changing the coordinates (u, v) of a selected pixel, the distance map D(tn) with respect to an image of the left eye I1 is measured.

As described above, in the present embodiment, relative positions and orientations of an image capturing apparatus and an object that is a measurement target are obtained at a plurality of times, and image coordinates used in matching are selected in accordance with the obtained positions and orientations.

By this, even under conditions where an object that is a measurement target or an image capturing apparatus moves, it is possible to use information of temporal luminance change of an image pixel to set the spatial size of a block to be small. In the case of a block having a small spatial size, flat surface approximation is possible even with respect to a shape having severe unevenness, and thus it is possible to measure a distance at high precision. Accordingly, it is possible to perform a distance measurement with high precision and without depending on the shape of the object.

Third Embodiment

In the present embodiment, explanation is given of a method of distance measurement under dynamic conditions. In the present embodiment, consideration is given to a case in which an image capturing apparatus is moved, similarly to the second embodiment.

In the first and second embodiments, the size of blocks to use in matching is fixed. In contrast to this, in the present embodiment, explanation is given of an example of appropriately selecting a temporal/spatial shape (size) of a block to use in matching, in accordance with the magnitude of movement of each site of an object on an image.

Figure 10:
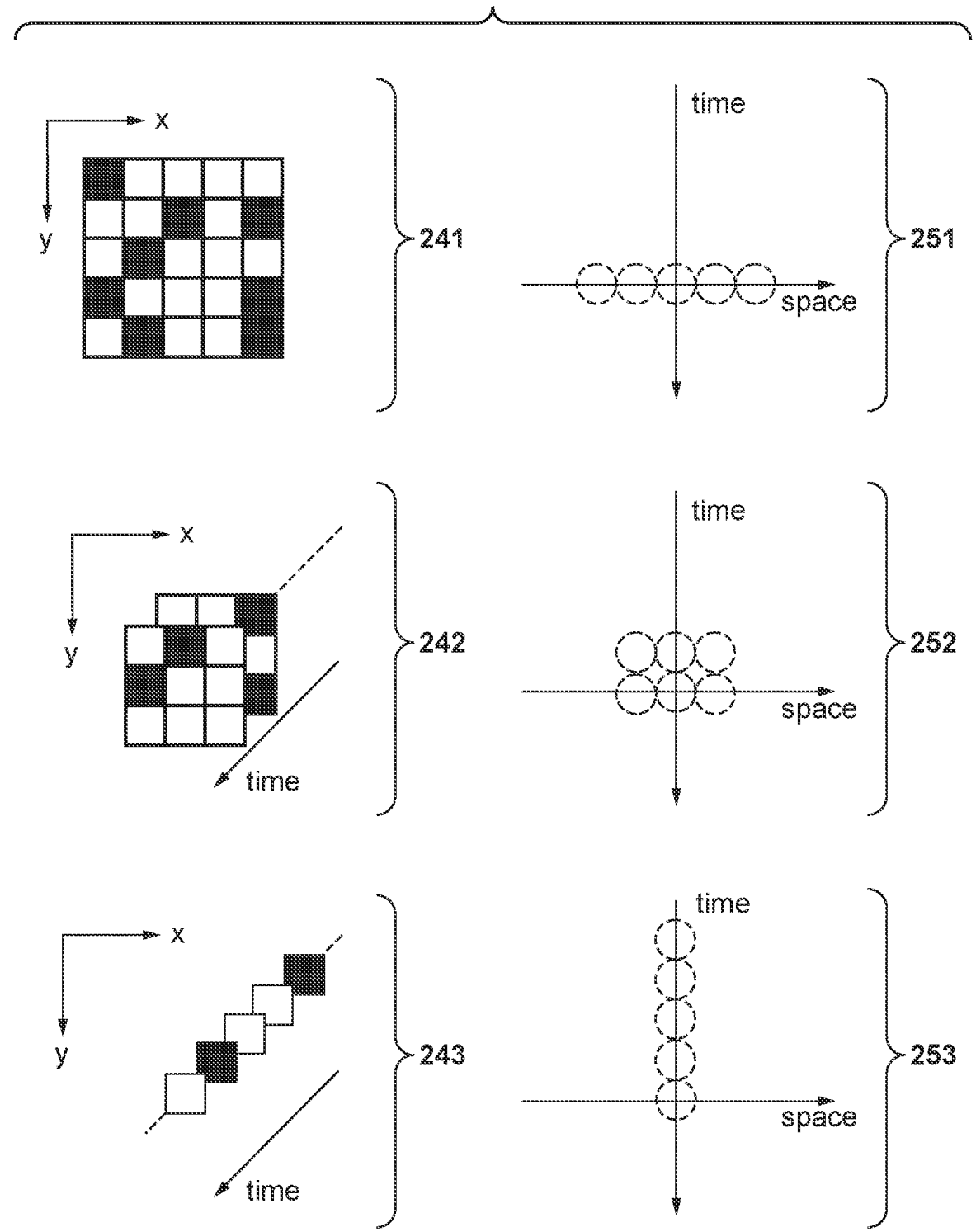
FIG. 10 is a view for explaining a block matching method according to a third embodiment.

Specifically, a dependence level on spatial information is increased for a site having large movement, and a block shape (size) as illustrated by reference numerals 241 and 251 of FIG. 10 is used. Conversely, a dependence level on temporal information is increased for a site having small movement, and a block shape (size) (explained in the first embodiment) as illustrated by reference numerals 243 and 253 of FIG. 10 is used. In addition, regarding a site for which the magnitude of movement is approximately intermediate, a block shape (size) as illustrated by reference numerals 242 and 252 of FIG. 10 is used. Note that the block shape can be adjusted in accordance with the temporal size M and the spatial size W in Equation (1).

<Configuration of Information Processing System>

Figure 11:
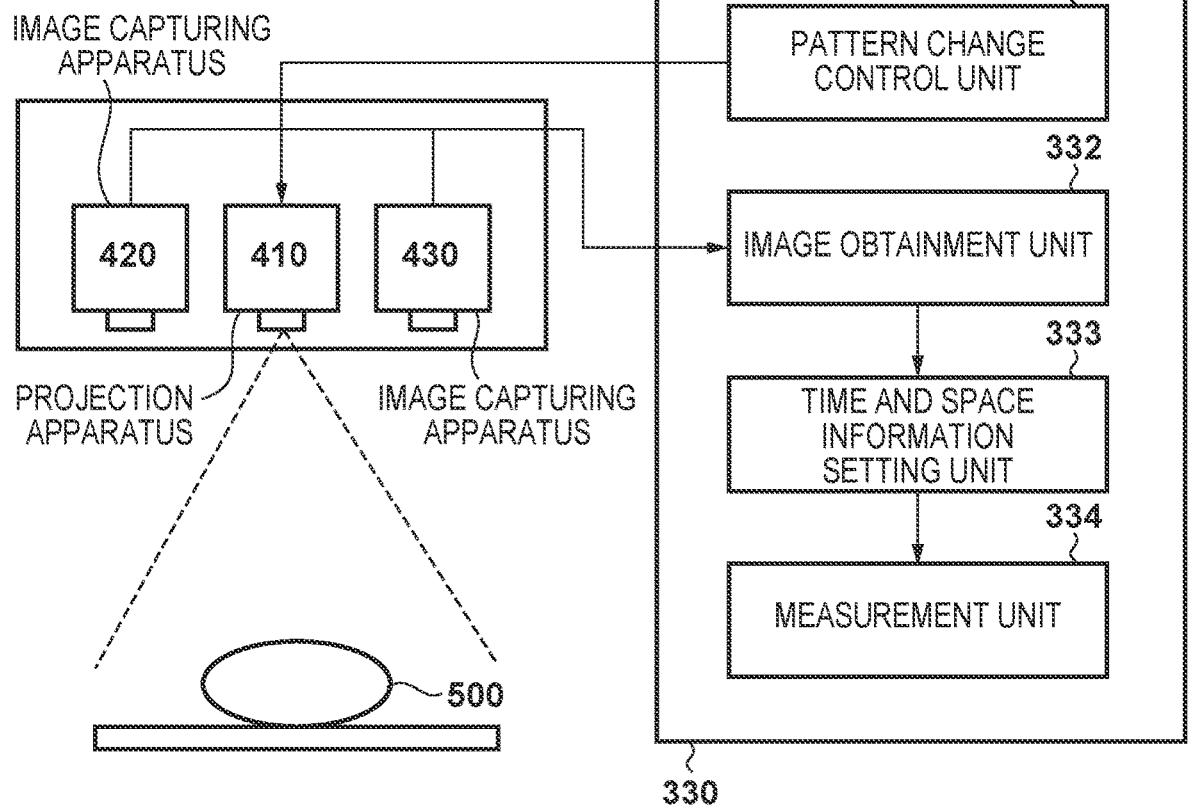
FIG. 11 is a view illustrating a configuration of an information processing apparatus according to the third embodiment.

Next, explanation is given regarding an example of a configuration of an information processing system according to the present embodiment. In the present embodiment, a configuration of an information processing apparatus differs from that in the first embodiment. In FIG. 11, reference numeral 330 indicates an information processing apparatus in the present embodiment. In the present embodiment, it is assumed that the projection apparatus 410 and the image capturing apparatuses 420 and 430 have a positional relationship that is fixed relative to each other. An information processing apparatus 330 is provided with a pattern change control unit 331, an image obtainment unit 332, a time and space information setting unit 333, and a measurement unit 334.

In the present embodiment, similarly to in the second embodiment, consideration is given of a case in which the object 500 is measured while moving the projection apparatus 410 and the image capturing apparatuses 420 and 430, which are fixed relative to one another, as a set. The pattern change control unit 331 and the image obtainment unit 332 have similar functions to the pattern change control unit 311 and the image obtainment unit 312 according to the first embodiment.

The time and space information setting unit 333 sets a block shape (size) to use in matching in accordance with the magnitude of movement of a scene. Specifically, the spatial size W and the temporal size M of a block are set for each of the coordinates (u, v) of the left eye I1.

The measurement unit 334 uses a block having the shape (size) set by the time and space information setting unit 333 to measure the distance map D(tn) with respect to an image of the left eye I1.

<Processing>

Figure 12:
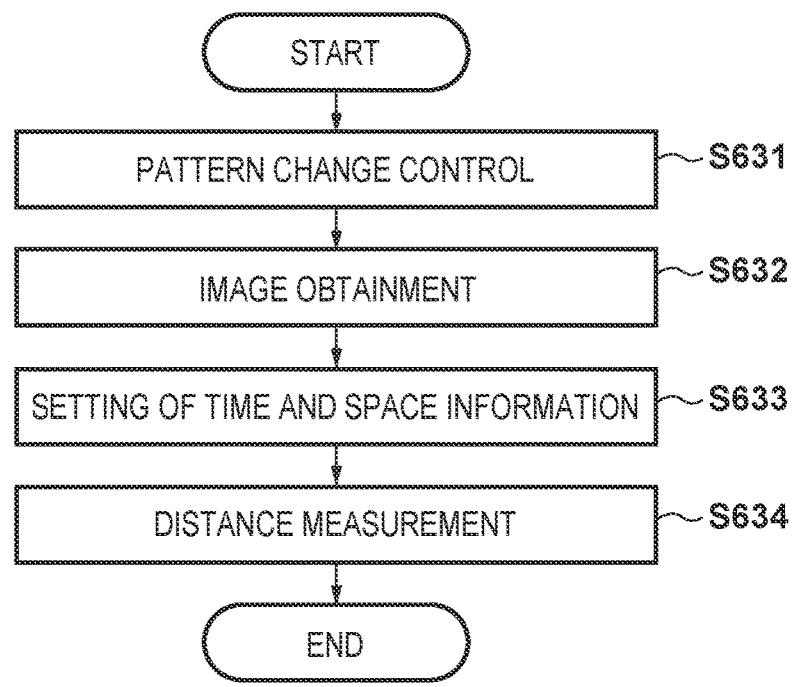
FIG. 12 is a flowchart for illustrating a processing procedure of an information processing apparatus according to the third embodiment.

Next, explanation is given regarding processing performed by an information processing apparatus according to the present embodiment. FIG. 12 is a flowchart that illustrates a procedure for processing that the information processing apparatus 330 according to the present embodiment performs.

Because processing in the present embodiment for pattern change control (step S631) and image obtainment (step S632) are the same as the processing in the first embodiment, explanation thereof is omitted. Explanation is given below regarding processing for setting time and space information (step S633) and measurement (step S634).

(Step S633)

The time and space information setting unit 333 sets a block shape (size) to use in matching in accordance with the magnitude of movement of a scene. Specifically, the spatial size W and the temporal size M of a block are set for each of the coordinates (u, v) of the left eye I1. In the present embodiment, the magnitude of movement at each of the coordinates (u, v) is estimated based on the distance map at each time t.

Firstly, a distance map at each time t is measured by using images for one time. Here, the distance map to measure is represented as D'(t). The distance map D'(t) can be calculated based on typical block matching that is based on spatial information of an image, for example. For example, the method recited in Manabu Hashimoto and Kazuhiko Sumi, "3-D Object Recognition Based on Integration of Range Image and Gray-scale Image", British Machine Vision Conference (BMVC), 2001 can be used.

Next, a map H(t) that represents differences of distance values between the distance maps D'(t) and D'(t−1) is measured. The difference of distance values at each of coordinates (u, v) of the left eye I1 is represented as H(t, u, v), and is calculated by Equation (10).

[EQUATION 10]

$$H(t,u,v)=|D'(t,u,v)-D'(t-1,u,v)| \qquad (10)$$

Next, the spatial size W and the temporal size M of a block are set for each of the coordinates (u, v) of the left eye I1. The sizes at each of coordinates (u, v) of the left eye I1 are respectively represented as W(u, v) and M(u, v), and are calculated by Equation (11) and Equation (12).

[EQUATION 11]

$$W(t, u, v) = \begin{cases} W\max & \text{if } \lfloor k \cdot H(t, u, v) \rfloor > W\max \\ \lfloor k \cdot H(t, u, v) \rfloor & \text{otherwise} \end{cases} \qquad (11)$$

[EQUATION 12]

$$M(t, u, v) = \begin{cases} 1 & \text{if } \lfloor M\max - s \cdot H(t, u, v) \rfloor < 1 \\ \lfloor M\max - s \cdot H(t, u, v) \rfloor & \text{otherwise} \end{cases} \qquad (12)$$

Wmax of Equation (11) is an upper limit that represents a spatial size of a matching block. k is a coefficient that represents a sensitivity with respect to the magnitude of movement, and a spatially larger block is set with respect to movement the larger the value of k is. Mmax of Equation (12) is an upper limit that represents a temporal size of a matching block. s is a coefficient that represents a sensitivity with respect to the magnitude of movement, and a temporally smaller block is set with respect to movement the larger the value of s is. The function $\lfloor x \rfloor$ is a function that represents a maximum integer less than or equal to x. For example, $\lfloor M\max - s \cdot H(t, u, v) \rfloor$ represents a maximum integer that is less than or equal to Mmax−s·H(t, u, v). Note that the values of Wmax, Mmax, k and s are fixed values that are set in advance.

(Step S634)

The measurement unit 334 uses a block having the shape (size) set by the time and space information setting unit 333 to measure the distance map D(tn) with respect to an image of the left eye I1. Details of processing here is similar to that of the first embodiment. However, when using Equation (1) to perform matching, a block shape (size) set by the time and space information setting unit 333 is used. Specifically, values of W(u, v) and M(u, v) calculated by Equation (11) and Equation (12) are set to the values of W and M in Equation (1).

As described above, in the present embodiment, a temporal/spatial shape (size) of a block to use in matching is appropriately selected, in accordance with the magnitude of movement of each site of an object on an image. By this, it is possible to stably measure with high precision the distance to an object that is a measurement target, independent of the magnitude of movement.

[First Variation: Variation of Apparatus Configuration]

In the present variation, explanation is given regarding a variation of a projection apparatus for projecting a texture pattern while causing the texture pattern to change. In the first through third embodiments, the projection apparatus is a projector that projects a texture pattern in accordance with input of an image. Specifically, a liquid-crystal projector or a DMD (Digital Mirror Device) projector is used. Here, by switching an image to input, different texture patterns are projected. However, the projection apparatus in the present invention may be any apparatus if it is an apparatus that can change a luminance value measured at each site of an object that is a measurement target.

Here, reference numerals 710, 720, and 730 of FIG. 13 indicate variations of a projection apparatus. Here, a texture pattern is projected while causing the texture pattern to change by using a light source 701 and an optical element 702 that generates a texture pattern in response to incidence of light to change on/off of the light source 701 and a relative position or orientation between the light source 701 and the optical element 702.

For example, configuration may be taken to provide a plurality of sets of the light source 701 and the optical element 702 as illustrated in the projection apparatus 710, and cause the texture pattern projected to change by switching light sources that emit light. The light source 701 may be any apparatus if it is an apparatus that emits light. The optical element 702 may be any element if it is an element that generates a texture pattern in response to the input of light. Specifically, as examples of the light source 701 and the optical element 702, an LED (Light Emitting Diode) light source and a texture pattern mask may be used, or a laser and a diffractive optical element (DOE) may be used.

In addition, as illustrated in the projection apparatus 720, the texture pattern to project may be caused to change by providing a plurality of the light source 701 and one optical element 702, and changing the position and direction of incident light that is incident on the optical element 702. In addition, as illustrated in the projection apparatus 730, the texture pattern projected may be caused to change by providing a mirror 703 and changing the position and direction of light incident on the optical element 702. In addition, the texture pattern to project may be caused to change by physically moving the light source 701 or the optical element 702. The texture pattern to project may be caused to change by moving the projection apparatus itself.

In addition, the texture pattern to project may be caused to change by changing on/off of emission of the light source 701. In addition, the texture pattern to project may be caused to change by changing the wavelength of the light source 701. Furthermore, the texture pattern to project may be caused to change by combining these approaches.

In addition, in a case of using a laser and a diffractive optical element (DOE) as types of the light source 701 and the optical element 702, the texture pattern to project may be caused to change by changing the frequency of the light of the laser. When the frequencies is changed, an angle of diffraction in the diffractive optical element (DOE) changes, and it is possible to cause the shape of the texture pattern to change.

It is possible to project texture patterns of a plurality of types in accordance with a method of switching an image of the texture pattern to project, or a method of switching a plurality of projection modules. In such a case, the temporal change of a luminance value at each site of the texture pattern can be arbitrarily set. By this, it is possible to reduce mistakes of matching by uniquely setting the temporal change of a luminance value based on a pseudorandom number such as an M-sequence, for example.

[Second Variation: Variation of Texture Pattern]

Figure 1:
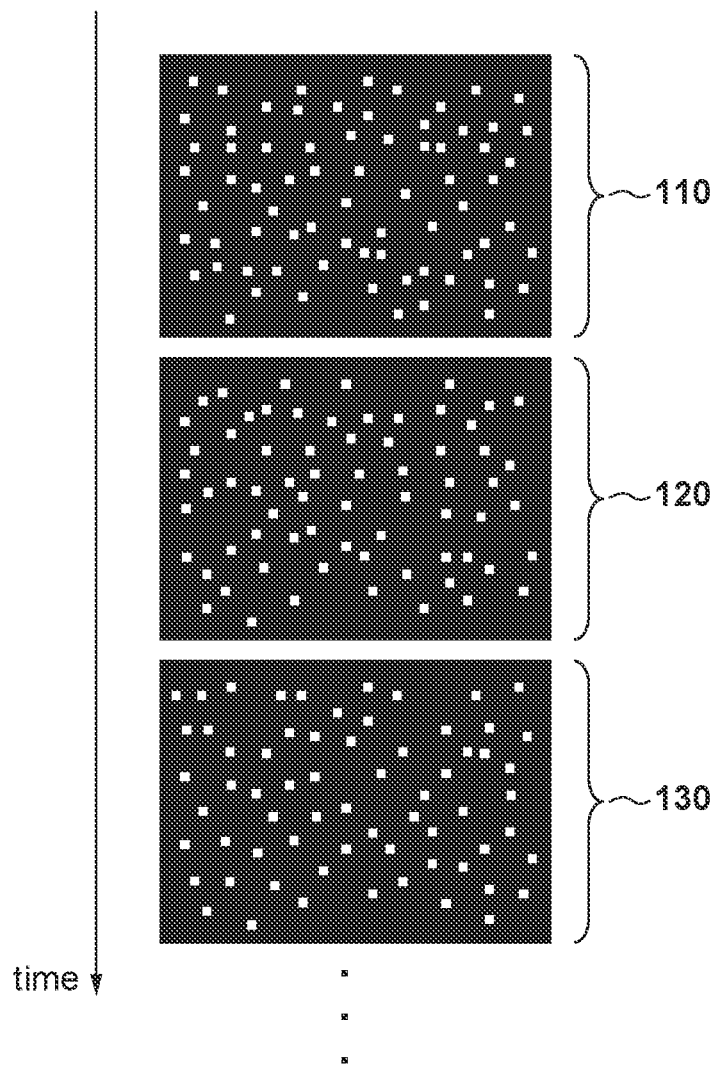
FIG. 1 is a view that illustrates an example of change of a texture pattern according to the present invention.

In the first through third embodiments, a random pattern as illustrated by reference numerals 110, 120, and 130 of FIG. 1 was used as examples of a texture pattern. However, the texture pattern in the present invention may be any pattern if it is a pattern for which luminance values change spatially. Setting may be performed by using a pseudorandom number, such as an M-sequence, so that a spatial distribution of luminance of the texture pattern is as unique as possible. A multivalued or color pattern may be used instead of the binary patterns illustrated in FIG. 1. In addition, the wavelength of a light to project may be visible light and may be infrared light. A pattern may be projected from one projection apparatus, or a pattern may be projected by causing a plurality of projection apparatuses to activate simultaneously.

In addition, the pattern change control units 311, 321, and 331 may perform any control if it is control that can change luminance values measured on the surface of an object that is a measurement target. Specifically, they may perform any control if it is control for causing at least one element out of luminance values, colors, an angle or position of projection, a shape of the texture pattern, or an arrangement of the pattern to change temporally. An arrangement of random dots may be changed, and the shape may be changed to a pattern that is not dots. The pattern may be caused to change by moving the projection apparatus to change the projection position.

[Third Variation: Special Example Without Pattern Change Control in a Moving Shot]

In the second embodiment, the pattern change control unit 321 changed the texture pattern projected onto the object 500 which is the measurement target with the passage of time. The intention was to cause light projected onto each site of the object 500 which is the measurement target to change. In the second embodiment, matching is performed based on this change.

However, if, as in the second embodiment, the image capturing apparatuses 420 and 430 and the projection apparatus 410 are a single body and furthermore the relative positions and orientations of the object 500 and the projection apparatus 410 change, light projected onto each site of the object 500 changes even with a texture pattern of a single type. In a case of using this principle, a pattern change control unit as described in the second embodiment is not needed.

[Fourth Variation: Variation of Processing by Position and Orientation Obtainment Unit]

The position and orientation obtainment unit 323 obtains relative positions and orientations of the object 500 and the image capturing apparatus 420. In the second embodiment, explanation was given for a method based on ICP (iterative closest point) that uses a distance map. However, a method of obtaining positions and orientations may be a method other than this. Configuration may be taken to equip the image capturing apparatus with an orientation sensor and a position sensor, and obtain measurement values from these. Configuration may be taken to control the image capturing apparatus by a robot, and obtain positions and orientations from control values. In addition, configuration may be taken to arrange markers in a scene, and perform measurements based on image information that capture these. In addition, configuration may be taken to perform measurements in accordance with a method that uses SLAM (Simultaneous Localization and Mapping), as illustrated in R. A. Newcombe, S. Izadi, O. Hilliges, D. Molyneaux, D. Kim, A. J. Davison, P. Kohli, J. Shotton, S. Hodges, and A. Fitzgibbon. KinectFusion: Real-Time Dense Surface Mapping and Tracking, ISMAR 2011.

In addition, a case of moving the image capturing apparatus 420 was envisioned in the second embodiment. However, the method of the present invention may be under any movement conditions if it is possible to obtain relative positions and orientations of the object 500 and the image capturing apparatus 420. The object 500 may be moved, and both of the object 500 and the image capturing apparatus 420 may be moved.

[Fifth Variation: Variation of Processing by Time and Space Information Setting Unit]

The time and space information setting unit 333 sets a block shape to use in matching in accordance with the magnitude of movement of a scene. In the third embodiment, the magnitude of movement of a scene is set based on temporal change of a distance map. However, another method may be used to measure the magnitude of movement. Configuration may be taken to attach a movement sensor to the object 500 or an image capturing apparatus, and the magnitude of movement may be set in accordance with a numerical value thereof, or a user may set the magnitude of movement for each time. In addition, configuration may be taken to separately prepare an image capturing apparatus for measuring a wavelength range different to that of the texture pattern of the projection apparatus, and perform the setting based on temporal change of luminance values of pixels of a measured image. In addition, magnitude of movement may be set for each of coordinates (u, v) on an image, or one magnitude of movement may be set for the whole image.

It is possible to prepare a plurality of types of block shapes whose spatial size W and temporal size M are different, calculate degrees of alignment while changing the parallax for each type of block, and then use the block shape for which the degree of alignment is the highest to estimate parallax. In such a case, there is no need to set a block shape in the time and space information setting unit 333.

In addition, the importance of time and space information may be set as an importance for each pixel position instead of a size. Specifically, in a case where there is a lot of movement in a scene, the importance of coordinates in an image temporally separated from the reference time to is set to be low, without changing the weighting spatially. Conversely, in a case where there is little movement in a scene, the importance of coordinates spatially separated from the coordinates (u, v) of interest is set to be low, without changing the weighting temporally. Based on the set importance, the measurement unit 334 calculates degrees of alignment by multiplying the difference of pixel values of Equation (2) or Equation (5) by the weighting.

[Sixth Variation: Variation of Distance Measurement]

In the first through third embodiments, explanation was given of examples in which the measurement units 313, 324 and 334 take parallax as a variable, and perform a measurement by searching for a parallax such that the degree of alignment E is a maximum. In contrast to this, measurement may be performed by taking distance as a variable because it is possible to convert between distance and parallax. The measurement unit in the present invention may perform measurement by any method if it is a method that can measure distances or parallaxes that align between images. A method of estimating parallax that uses randomness as indicated in M. Bleyer, C. Rhemann, and C. Rother, Patch-Match Stereo—Stereo Matching with Slanted Support Windows, Proc. BMVC, 2011 may be used, and a measurement method that uses an optimization such as BP (Belief Propagation) or GC (Graph Cut) may be used. Range information calculated by a measurement unit may be any of a parallax value, a distance value, or a value of three-dimensional coordinates.

In addition, in the first through third embodiments, explanation was given of a method that uses SAD, as a method for calculating degrees of alignment. However, for degrees of alignment, any method may be used if it is a calculation method for which an evaluation value becomes higher the more that regions on images to compare align. SSD (Sum of Squared Difference) may be used, and NCC (Normalized Cross-Correlation) may be used.

[Seventh Variation: Variation Relating to Times]

In the first through third embodiments, the distance to an object is measured by setting a time tn for measuring distance as a reference, and using M images from the time tn−(M−1) to the time tn. However, there is no need for times selected to be all used in chronological order. Images for times here and there may be selected, and images at separated times may be selected. For example, images may be selected by removing images having high highlight detail loss or many defects. In addition, images such that the degree of alignment of matching becomes high may be selected by changing a combination of several image selections.

In addition, the time to for measuring distance is any time. Therefore, the distance map may be measured for all times at which images are captured, for example.

[Eighth Variation: Variation of Number of Cameras]

In the first through third embodiments, distance is measured in accordance with matching between two the image capturing apparatuses 420 and 430. However, in the method according to the present invention, the number of image capturing apparatuses may be one. In such a case, the distance at which the image by the image capturing apparatus 420 and the texture pattern projected from the projection apparatus 410 align is measured by matching. In other words, distance measurement to the object is performed by searching correspondences between the image by the image capturing apparatus 420 and the texture pattern projected by the projection apparatus 410, based on temporal change of pixel values. In addition, there may be more than two image capturing apparatuses. In such a case, a distance at which there is alignment between images of a plurality of viewpoints is measured by matching.

[Ninth Variation: Variation of Output]

In the first through third embodiments, the distance map is measured by taking the viewpoint of the left eye I1 (the image capturing apparatus 420) as a reference. However, any viewpoint may be a viewpoint for measuring the distance map. It may be the viewpoint of the right eye I2 (the image capturing apparatus 430) or it may be a viewpoint that is arbitrarily set. In addition, an output result according to the present invention may be a parallax, and it may be outputted details resulting from further converting a distance value to a three-dimensional position.

[Tenth Variation: Usage of Output Result]

A distance map outputted by the present invention can be used for any intended use. For example, it may be used in an intended use such as recognition of an object, an inspection, measurement of positions and orientations, modeling, gesture recognition of a human body, and medical diagnosis.

<Effect>

In the first embodiment, it is possible to set the spatial size of a block to be small by performing matching that applies information of temporal luminance change of image pixels. In the case of a block having a small spatial size, flat surface approximation is possible even with respect to a shape having severe unevenness, and thus it is possible to measure a distance at high precision.

In the second embodiment, relative positions and orientations of an image capturing apparatus and an object are obtained at a plurality of times, and image coordinates used in matching are selected in accordance with the positions and orientations. By this, even under conditions where the object or the image capturing apparatus moves, it is possible to use information of temporal luminance change of an image pixel to set the spatial size of a block to be small. In the case of a block having a small spatial size, flat surface approximation is possible even with respect to a shape having severe unevenness, and thus it is possible to measure a distance at high precision.

In the third embodiment, a shape in time and space (size) of a block to use in matching is appropriately selected, in accordance with the magnitude of movement of each site of an object on an image. By this, it is possible to stably measure with high precision the distance to the object, independent of the magnitude of movement.

In the first variation, explanation was given of a different method for projecting a texture pattern while causing it to change. In particular, it is possible to project texture patterns of a plurality of types in accordance with a method of switching an image of the texture pattern to project, or a method of switching a plurality of projection modules. In such a case, because it is possible to uniquely and arbitrarily set the temporal change of the luminance value of each site of a texture pattern, it is possible to reduce mistakes in matching.

Definitions

In the present invention, a texture pattern to project onto an object may be any pattern if it is a pattern for which luminance values change spatially. It may be random dots, and it may be a pattern having multivalued luminance change.

The measurement unit may use any method if it is a method that measures information relating to distance to an object by searching, based on temporal change of pixel values, correspondences between images captured by an image capturing apparatus. A method that performs matching between stereo images based on the temporal change of pixel values and searches for a distance value having a high degree of alignment may be used, and the distance value may be estimated by applying optimization such as BP (Belief Propagation).

By the present invention, it is possible to performed a distance measurement with high precision and without depending on the shape of the object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-129134, filed Jun. 29, 2016, which is hereby incorporated by reference wherein in its entirety.

What is claimed is:

1. An information processing apparatus, comprising:
a control unit configured to control a pattern that a projection apparatus projects onto an object;
an obtainment unit configured to obtain a plurality of images respectively captured at a plurality of times by a plurality of image capturing apparatuses that capture the object onto which the pattern has been projected;
a position and orientation obtainment unit configured to obtain relative position and orientation information for a plurality of times between the object and a plurality of image capturing apparatuses; and
a measurement unit configured to measure range information of the object by performing matching, between images respectively captured by the plurality of image capturing apparatuses, using information of temporal change of luminance values of the images, wherein the measurement unit acquires two-dimensional positions of pixels for which to perform the matching in the plurality of images respectively, the two-dimensional positions of the pixels changing according to a change of position and orientation of an object to a plurality of image capturing apparatuses, based on the position and orientation information for the plurality of times, and uses luminance values of the pixels at the acquired two-dimensional positions of the pixels to perform the matching.

2. The image processing apparatus according to claim 1, further comprising:
a setting unit configured to set a temporal and spatial shape of a block to use in the matching, based on a magnitude of movement of the object in an image,
wherein the measurement unit measures the range information by performing the matching using the information of the temporal change of luminance values of the images based on a block of the shape set by the setting unit.

3. The information processing apparatus according to claim 2, wherein
the setting unit sets a temporal size of the block to be larger the smaller the movement of the object is.

4. The information processing apparatus according to claim 1, wherein
the projection apparatus is provided with one or more light sources and one or more optical elements that generate a pattern in accordance with incidence of light from the one or more light sources, and
the control unit causes the pattern to change by causing at least one of a position and direction of light from the light sources incident on the optical element, on/off of light emission by the light source, and a wavelength of the light source to change.

5. The information processing apparatus according to claim 1, wherein
the control unit causes the pattern that the projection apparatus projects onto the object to change.

6. The information processing apparatus according to claim 1, wherein
the pattern is a texture pattern.

7. The information processing apparatus according to claim 1, wherein
the range information is any of a parallax value, a distance value, and a value of three-dimensional coordinates.

8. A method of controlling an information processing apparatus, the method comprising:
controlling a pattern that a projection apparatus projects onto an object;
obtaining a plurality of images respectively captured at a plurality of times by a plurality of image capturing apparatuses that capture the object onto which the pattern has been projected;
obtaining relative position and orientation information for a plurality of times between the object and an image capturing apparatus, and
measuring range information of the object by performing matching, between images respectively captured by the plurality of image capturing apparatuses, using information of temporal change of values of the images,
wherein in the measuring, two-dimensional positions of pixels are acquired for which to perform the matching in the plurality of images respectively, the two-dimensional positions of the pixels changing according to a change of position and orientation of an object to a plurality of image capturing apparatuses, based on the position and orientation information for the plurality of times, and uses information of luminance values of the pixels at the acquired two-dimensional positions of the pixels to perform the matching.

9. A non-transitory computer-readable storage medium storing a computer program for causing a computer to execute a method of controlling an information processing apparatus, the method comprising:
controlling a pattern that a projection apparatus projects onto an object;
obtaining a plurality of images respectively captured at a plurality of times by a plurality of image capturing apparatuses that capture the object onto which the pattern has been projected;
obtaining relative position and orientation information for a plurality of times between the object and an image capturing apparatus, and
measuring range information of the object by performing matching, between images respectively captured by the plurality of image capturing apparatuses, using information of temporal change of values of the images,
wherein in the measuring, two-dimensional positions of pixels are acquired for which to perform the matching in the plurality of images respectively, the two-dimensional positions of the pixels changing according to a change of position and orientation of an object to a plurality of image capturing apparatuses, based on the position and orientation information for the plurality of times, and uses information of luminance values of the pixels at the acquired two-dimensional positions of the pixels to perform the matching.

* * * * *